A. C. BROVALD.
BEEHIVE CARRIER.
APPLICATION FILED FEB. 20, 1908.
905,643.
Patented Dec. 1, 1908.
2 SHEETS—SHEET 1.
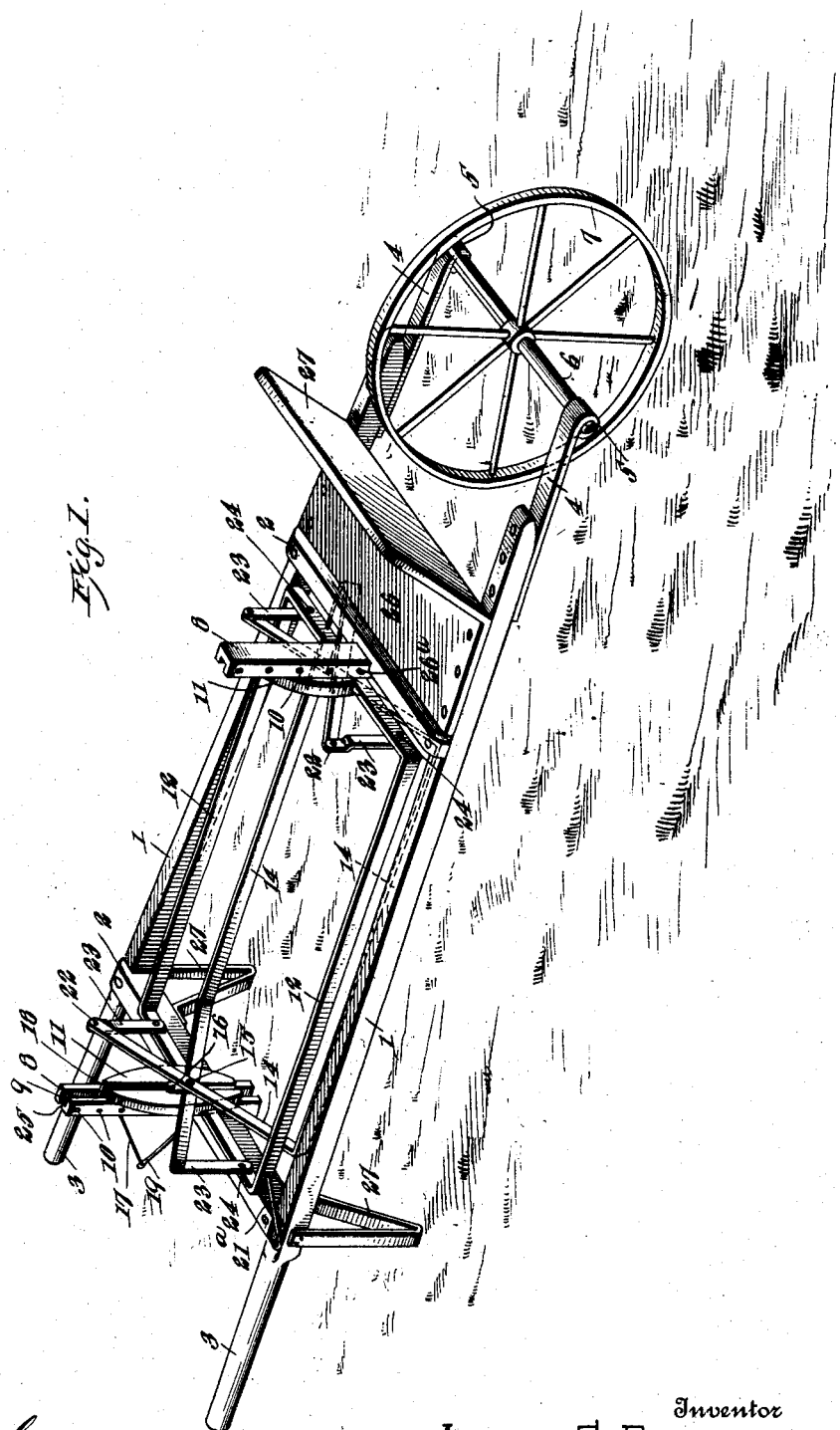
Witnesses
E. H. Callaghan
C. E. Fraurer
Inventor
ANDREW C. BROVALD
By Attorney Munn & Co.

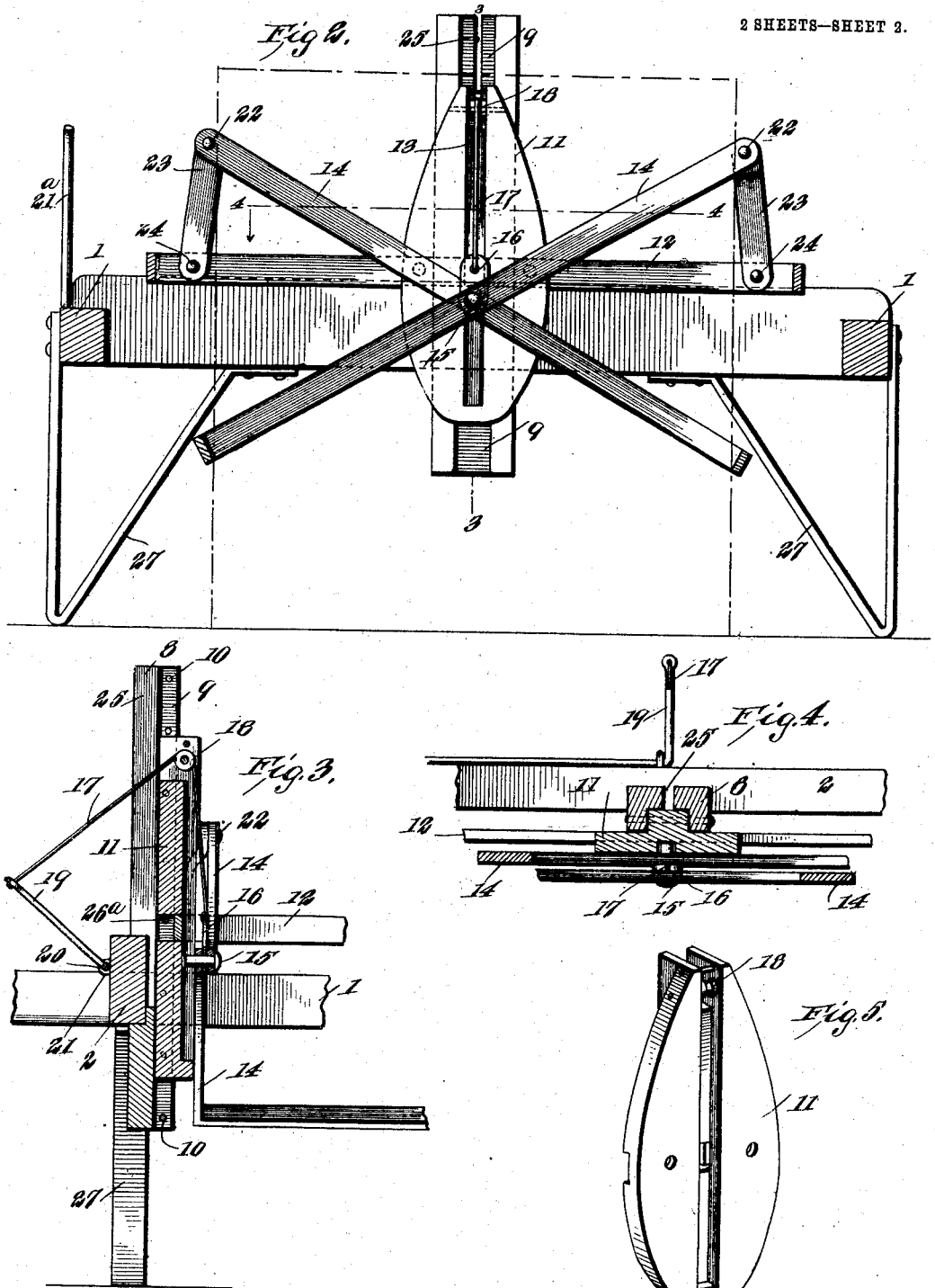

UNITED STATES PATENT OFFICE.

ANDREW C. BROVALD, OF FINLEY, WISCONSIN.

BEEHIVE-CARRIER.

No. 905,643.	Specification of Letters Patent.	Patented Dec. 1, 1908.

Application filed February 20, 1908.  Serial No. 416,930.

*To all whom it may concern:*

Be it known that I, ANDREW C. BROVALD, a citizen of the United States, and a resident of Finley, in the county of Juneau and State of Wisconsin, have invented certain new and useful Improvements in Beehive-Carriers, of which the following is a specification.

My invention is an improvement in bee hive carriers; and consists in certain novel constructions and combinations of parts hereinafter described and claimed.

Referring to the drawings forming a part hereof Figure 1 is a perspective view of my improvement. Fig. 2 is a transverse section. Fig. 3 is a section on the line 3—3 of Fig. 2. Fig. 4 is a section on the line 4—4 of Fig. 2, and Fig. 5 is a detail of one of the slides.

The present embodiment of my invention comprises a wheeled frame, consisting of the side bars 1 connected by cross-bars 2, the side bars being provided at their front ends with handles 3, and at their rear ends with plates 4, provided at their free ends with bearings 5, in which is journaled an axle 6 of a wheel 7.

The side bars 1 and the cross-bars 2, provide an open frame, at each end of which is placed an upright 8, provided on its inner face with a guideway 9 and with a plurality of transverse openings 10 for a purpose to be presently described.

A slide 11 is movable in each of the guideways, the said slides being connected with a rectangular frame 12, and being provided on their inner faces with a groove 13. U shaped bars 14 are connected with the frame, the arms of the bars at each end of the frame being connected by a pivot pin 15, which is slidable in the groove 13 before mentioned, and one of said pivot pins has journaled thereon a plate 16 provided at its upper end with an opening for receiving a cord 17, which passes over a pulley 18 journaled at the upper end of the groove 13, and the outer end of the cord is connected with an arm 19 of a rod 20 journaled in bearings 21 on the front cross-bar, and provided at its outer end with a handle 21ª for convenience in manipulating the rod.

The free ends of the arms of the bars 14, are pivotally connected as at 22, with links 23, which are pivoted as at 24 to the rectangular frame 12.

The front upright is slotted as at 25, to permit the cord 17 to move with the slide 11, and at the rear of the frame is arranged a cross horizontal board 26, and an upright board 27.

In operation, the slides 11 are adjusted into a position corresponding to the height at which the bee hive is to be grasped, and are retained in their adjusted position by means of pins 26ª which are passed through one of the openings in the uprights 8, the slides resting on the pins. The handle 21ª is now pulled forward onto the handle 3, thus elevating the pivot pins of the U shaped bars, and as a consequence moving the said bars toward the rectangular frame 12. It will be evident with this movement the body portions of said bars are moved away from each other, thus widening the space between the body portions of the bars. The frame is now moved into a position over the bee hive, so that the hive projects through the opening formed between the side bars 1 and the cross-bars 2. The frame is lowered to the proper position, and the handle 21ª is released. The bars 14 move downwardly of their own weight and grasp the sides of the hive. By now moving the handles 3 up the hive is lifted and may be wheeled to any desired position.

When the desired position for the hive is reached, the frame is lowered until the hive is in contact with the ground, and by moving the handle 21ª again forward on the handle 3 the hive is released. It will be noticed that the frame is provided with legs 27 near the front end thereof for supporting the same.

It will be evident from the description that the bars 14 normally rest against the side of the hive when the hive is in the frame, said bars having a swinging connection with the rectangular frame, and that a downward strain on the body portion of the bars tends to force them toward each other, thus increasing the strength of the grip according to the weight to be lifted.

I claim:—

1. A beehive carrier, comprising a wheeled frame, having an opening to receive the hive, a vertical guideway at each end of the frame, a slide provided on its inner face with a vertical groove movable in each of the guideways, a substantially rectangular frame connected with the slides, a pair of U shaped bars having their body portions arranged parallel with the sides of the rectangular frame, a pivot pin connecting the corresponding arms of the respective bars at approximately their centers, said pins engaging the grooves of the slides, a link connecting the free end of each arm with the rectangular frame, a pulley at the top of one of the slides, a rod journaled on the wheeled frame and provided at its inner end with an angular arm and at its outer end with a handle, a cord passing over the pulley and connected at one end with the pivot pin and at the other with the arm, and means for adjusting the slides in the guideways.

2. A bee hive carrier, comprising a wheeled frame having an opening to receive the hive, a vertical guideway at each end of the opening, a slide provided with a vertical groove on its inner face movable in each of the guideways, an open frame connected with the slides, U shaped bars having the body portions arranged parallel with the sides of the frame, pivot pins connecting the corresponding arms of the bars, said pins moving in the grooves, a link connecting the free end of each arm with the open frame, means for adjusting the slides in the guideways, and means for raising and lowering the slides.

3. A bee hive carrier, comprising a frame for receiving the hive, a wheeled support for the frame, means for adjusting the frame with respect to the support, a pair of U-shaped bars arranged with their body portions parallel with the sides of the frame, and with the arms of one crossed and pivotally connected with the arms of the other, a link connecting the free end of each arm with the frame, and means connected with the pivotal connection of the arms for raising and lowering said arms whereby to move the body portions of the bars toward and from each other.

4. A bee hive carrier, comprising a frame for receiving the hive, a pair of U-shaped bars arranged with their body portions parallel with the frame and with the arms of one crossed with the arms of the other and pivotally connected, a link connecting the free end of each arm with the frame, means for raising and lowering the crossed portions of the arms whereby to move the body portions toward and from each other, and means whereby to transport the frame.

5. A bee hive carrier, comprising a frame for receiving the hive, means for supporting the frame, means for adjusting the frame on the support, a pair of bars having a swinging connection with the frame, and normally engaging the hive when in the frame, and means for releasing the bars.

ANDREW C. BROVALD.

Witnesses:
A. C. JOHNSON,
GEO. L. WARD.